United States Patent
Matheson et al.

(10) Patent No.: US 10,375,520 B1
(45) Date of Patent: Aug. 6, 2019

(54) LOW-BANDWIDTH INFORMATION DISTRIBUTION

(71) Applicant: United Services Automobile Association (USAA), San Antonio, TX (US)

(72) Inventors: Cory Matheson, Celina, TX (US); Matthew Flachsbart, Grapevine, TX (US); Snehal Desai, Richardson, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

(21) Appl. No.: 15/353,558

(22) Filed: Nov. 16, 2016

Related U.S. Application Data

(60) Provisional application No. 62/259,955, filed on Nov. 25, 2015.

(51) Int. Cl.
   *H04M 11/04* (2006.01)
   *H04W 4/02* (2018.01)
   *H04W 4/90* (2018.01)
   *H04W 84/04* (2009.01)

(52) U.S. Cl.
   CPC .............. *H04W 4/023* (2013.01); *H04W 4/90* (2018.02); *H04W 84/042* (2013.01)

(58) Field of Classification Search
   CPC ....... H04W 4/22; H04W 76/007; H04W 4/06; H04W 4/14; H04W 64/00
   USPC ......... 455/555, 466, 418, 436, 404.1, 404.2, 455/410, 456.1, 556.2, 411, 412.1, 402.2; 370/206, 225, 432, 532, 237, 254
   See application file for complete search history.

(56) References Cited

U.S. PATENT DOCUMENTS

| | | | | |
|---|---|---|---|---|
| 8,515,385 B2* | 8/2013 | Sennett | .................. | H04W 4/22 370/312 |
| 8,948,721 B2* | 2/2015 | Sennett | .................. | H04W 4/22 455/404.1 |
| 9,210,561 B2* | 12/2015 | Buck | ...................... | H04W 4/22 |
| 9,241,248 B2* | 1/2016 | Giacoletto | ............. | H04W 4/06 |
| 9,820,120 B2* | 11/2017 | deCharms | ............... | H04W 4/22 |
| 2010/0144309 A1* | 6/2010 | Nalley | .................. | H04W 64/00 455/404.2 |
| 2012/0309341 A1* | 12/2012 | Ward | ...................... | H04W 4/22 455/404.2 |
| 2014/0142958 A1* | 5/2014 | Sharma | .................. | G10L 19/02 704/500 |
| 2014/0291334 A1* | 10/2014 | Palmeri | ............... | B67D 3/0009 220/592.18 |

(Continued)

*Primary Examiner* — Joseph Arevalo
(74) *Attorney, Agent, or Firm* — Fish & Richardson P.C.

(57) ABSTRACT

Methods, systems, and apparatus, including computer programs encoded on computer storage media, for low bandwidth communication. One of the methods includes receiving a request from a mobile device over a low bandwidth channel, the request being for information about emergency services from a mobile device. The method includes identifying a location of the mobile device. The method includes identifying a requested emergency service within an area determined, at least in part, by the location of the mobile device. The method also includes providing information about the identified emergency service to the mobile device over the low bandwidth channel.

12 Claims, 7 Drawing Sheets

(56) References Cited

U.S. PATENT DOCUMENTS

| | | | |
|---|---|---|---|
| 2014/0368601 A1* | 12/2014 | deCharms | H04W 4/021 348/14.02 |
| 2015/0140924 A1* | 5/2015 | Marathe | H04W 4/90 455/3.01 |
| 2015/0156717 A1* | 6/2015 | Narasimha | H04W 52/0209 370/311 |
| 2016/0192166 A1* | 6/2016 | deCharms | H04W 4/021 348/14.02 |

* cited by examiner

LOW-BANDWIDTH INFORMATION DISTRIBUTION

CROSS-REFERENCE TO RELATED APPLICATION

This application claims priority to U.S. Application Ser. No. 62/259,955, filed on Nov. 25, 2015, which is incorporated herein by reference in its entirety.

BACKGROUND

During a catastrophic event, (such as a hurricane, fire, ice storm, earthquake, flood, etc.) people caught within the disaster area may be without essential services for a long period of time. For example, there may be no potable water, food, or power. Additionally, communication systems may have inconsistent availability. Even if the communication infrastructure is intact, the system may be overloaded, making it difficult for individuals to communicate.

SUMMARY

This specification describes technologies relating to wireless communication.

In general, one innovative aspect of the subject matter described in this specification can be embodied in methods that include the actions of receiving a request from a mobile device over a low bandwidth channel, the request being for information about emergency services from a mobile device. The method includes the action of identifying a location of the mobile device. The method includes the action of identifying a requested emergency service within an area determined, at least in part, by the location of the mobile device. The method also includes the action of providing information about the identified emergency service to the mobile device over the low bandwidth channel.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. The low bandwidth channel may be a control channel on a cellular network. The methods may include the actions of receiving information about an emergency service from a third party system. The methods may include the actions of receiving a check-in request from the mobile device, identifying one or more individuals to notify, and notifying the one or more individuals that the user has checked-in. The methods may include the actions of identifying one or more other users who have checked in and are associated with the user and providing a list of the one or more other users to the mobile device. The methods may include the action of providing directions to a rendezvous point. The methods may include the action of providing directions to at least one of the one or more other users. The check-in request may identify a plurality of individuals to check-in. The methods may include the action of updating a missing persons list based on the check-in request. The mobile device may select a communication channel based from a plurality of communication channels based on the availability of the channels. The emergency service may include at least one of first aid, food service, insurance information, clothing distribution, shelter, non-governmental agencies, FEMA, evacuation zones for assembly, and closure information. The method may include the actions of providing a digital map of an affected area.

Particular embodiments of the subject matter described in this specification can be implemented so as to realize one or more of the following advantages. Communication in an emergency can be improved. Communication can occur using less bandwidth. Users may obtain information about emergency relief efforts. The system can communicate using a number of different communication channel. The system can periodically determine if a preferred communication channel has become available.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Communication during and immediately after a catastrophe is extremely important. Communication connects affected people, families, and communities with first responders, support systems, and other family members. Unfortunately, during a catastrophe communication systems are likely to be compromised or over loaded, making communication difficult and unreliable.

Figure 1:
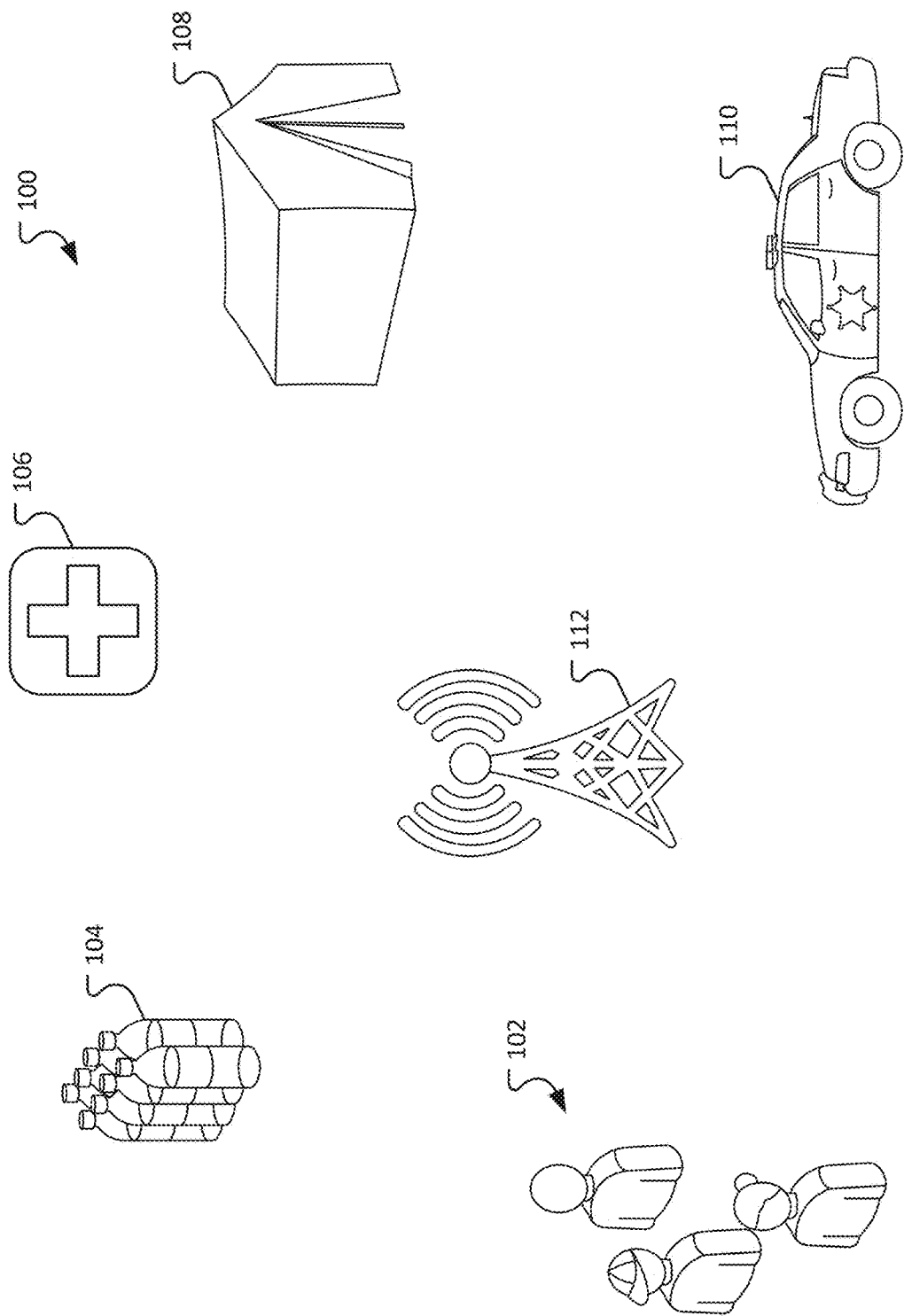
FIG. 1 is diagram illustrating actors in a disaster area.

Referring to FIG. 1, during a catastrophe affected individuals 102 may need access to vital support services, such as food and water 104, medical aid 106, and shelter 108. The affected individuals 102 may try to communicate over a cellular or other communications network 112. The affected individuals 102 may need other forms of help. And may wish to know whether their friends and family in the affected area are healthy and safe.

However, even when the network is available, the network may be overloaded by other affected individuals 102 and emergency personnel 110. For example, a typical cell tower may support only a limited number of simultaneous calls. This limit is not usually an issue; however, during an emergency call usage may spike, making it difficult of impossible to send a message.

A system can provide users with a mechanism to send and receive messages using low bandwidth communication mechanisms. These low bandwidth mechanism improve communication be providing the users with the essential information they want and need while providing adding a smaller load to the communication infrastructure.

Figure 2:
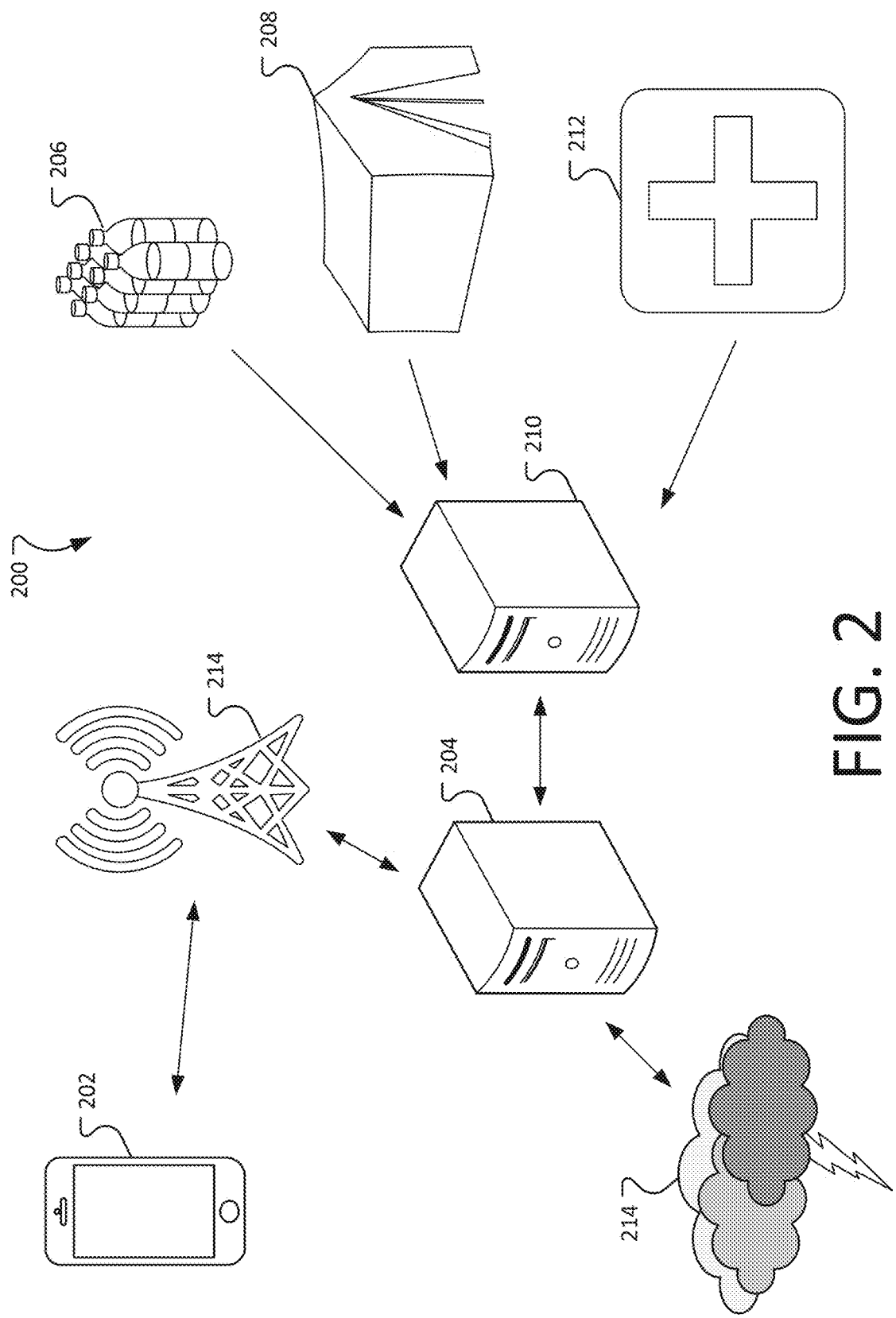
FIG. 2 illustrates an example environment for low bandwidth communication.

FIG. 2 illustrates an example environment 200 for low bandwidth communication. A user may have a mobile device 202 equipped with hardware sufficient to communicate on a cellular network and, potentially, use Wi-Fi network communications (for example, a cellular telephone, smart phone, or other similar device). The smartphone send a message to a communication server 204. The communication server may be configured to receive messages over a wide variety of different channels.

For example, the mobile device may communicate with the communication server through a cellular network. For example the mobile device may send a message to a radio tower 214 that is part of a cellular network. The cellular network provider (for example, the cellular networking infrastructure) may send a message to the communication server 204.

In some implementations, the mobile device 202 may communicate with the communications server 204 by sending messages over a control channel. In cellular communication, a control channel is a central channel that controls connected mobile devices (for example, the mobile device 202) by handling data streams. When the mobile device is powered up, it listens for an SID on a predetermined frequency that the mobile device and base station use to talk to set up calls and change radio channels. Generally, if the smartphone 202 cannot find any control channels to listen to, it knows it is out of range and displays a "no service" message. Generally, the control channels are the last channels to be to be disabled in a catastrophe.

The mobile device 202 may send a specially coded message on the control channel that the cellular network can decode and determine that the user of the mobile device 204 wishes to communicate with the communication server 204. For example, the mobile device 202 may send a request to set up a telephone call using a numerical string that does not resolve into a valid telephone number. For example, the mobile device 202 may attempt to establish a telephone call to *FOOD (*3663) or *WATER (*92837) to request information about the availability of food and water. Similar communications may be established to obtain information about shelter, request help, or to check-in with the service, as discussed further below.

During the catastrophe, emergency services may be deployed to help affected individuals within the disaster area. For example, relief efforts may provide emergency services such as water 206, shelter 208, and medical help 212. When a relief effort establishes a location to provide the services, the organization providing the relief effort may notify a command and control center 210 of the location where the supplies are distributed. Information from the command-and-control center 210 may be provided to the communication server 204.

In some implementations, the communication server 204 and the command-and-control server 210 may be the same computing system.

Communication between the communication server 204 and the command-and-control server 210 may be initiated by the command-and-control center 210 or initiated by the communication server 204.

While the figure displays a server used to manage and coordinate the relief efforts. In some implementations, relief efforts may be coordinated manually. In these scenarios, individuals may provide the information directly to the communication server 204. For example, an employee or agent of the organization providing the communication server may have a liaison with the command-and-control center of the relief effort.

When the communication server 204 receives the request from the mobile device 202 it may decode the message to determine the type of information that is requested. If the request is for information about a good or service available at a location, then the communication server 204 may send the location of the requested good or service to the smartphone 202. For example, if the mobile device 202 requests the location of a water distribution location, and the command-and-control center has identified that water is being distributed at "123 Main St." then the communication server 204 may send the address "123 Main St." to the mobile device 202.

Information that the communication server 204 may provide includes, but is not limited to, first aid, food services, insurance company information, clothing distribution, shelter, NGO/FEMA information, evacuation zones for assembly, road closures, and area closures. In some implementations, the communication server may provide a digital map or the area around the user.

The response from the communication server 204 to the mobile device 202 may be sent using the control channel. In some implementations, the response may be encoded to reduce the use of bandwidth.

The communication system may identify the location of the mobile device 202. For example, the communication system may identify or may be provided information about the cellular tower 214 from which the request originated. For example, when the mobile device powers up, the mobile device registers with the cellular provider. The cellular provider tracks the cell that the smartphone is in. The mobile device 202 may also provide the last known location using GPS coordinates stored in the smartphone 202.

When the communication server 204 has identified the location of a user requesting help the communication server may notify first responders of the location.

In some implementations, a user may send a message to the communication service 204 checking in. In some implementations, the communication server may update a list of missing persons. For example, the communication server may obtain the list of missing persons from the command and control center and update the list to remove users who check-in. In some scenarios, the communication server may notify a maintainer of a missing persons list that an individual has checked in. In some implementations, the user may check-in multiple individuals using the same mobile device 202.

In response to receiving the check-in message the communication server may reach out and contact one or more individuals (referred to as a group) previously identified by the user. In some implementations, the communication server may respond to the user identifying any individuals previously identified by the user who have also checked in to the communication server. For example, a wife, in response to checking in, may be notified that her husband has also checked in.

In some implementations, the user may receive the location and/or directions to the other individuals who have checked in. For example, a wife, in response to checking in, may be provided with the location and directions to reach her husband.

In some implementations, a user may supply a rendezvous location where the members of the family or group may meet. For example, the user may specify that the group meet at a particular address ('123 Main Street'). In some implementations, the user may specify one or a number of predetermined locations (e.g. location 1, location 2, etc.). Each member of the group may receive or be able to retrieve the rendezvous location by contacting the communication service.

The communication server 204 may also receive information about the weather 214. This information may include, for example, a forecast of future disasters. In some implementations, the communication server 204 may send notifications to mobile device 202 of further potential emergencies or disasters (for example, subsequent storms, etc.).

Figure 3:
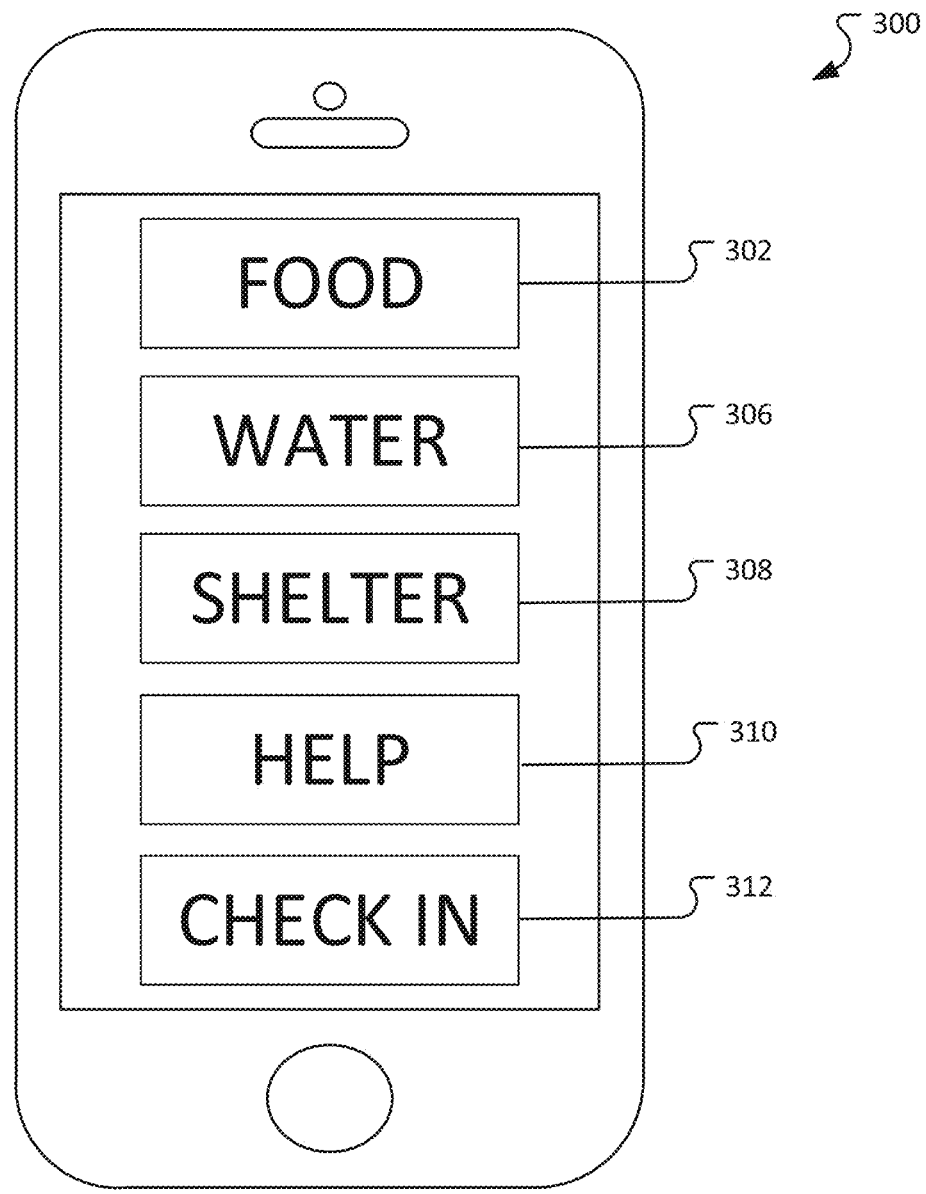
FIG. 3 illustrates an example of a user interface of an app for a mobile device in communication with a communication service.

FIG. 3 illustrates an example of a user interface of an app for a mobile device 300 in communication with a communication service. Because individuals in a disaster area may be in a state of shock the app may provide a simple interface that is easy to navigate. In this example, the user interface includes large buttons with easy to read lettering. The user interface includes a food button 302, a water button 306, a shelter button 308, a help button 310, and a check-in button 312.

When the user selects one of the buttons the app can send the appropriate message to the communication server. For example, if the user presses the water button 306, the app may cause the mobile device to send the *WATER call request over the control channel, as described above. In some implementations, the app may use other communication methods, as described further below with respect to FIG. 5.

Figure 4:
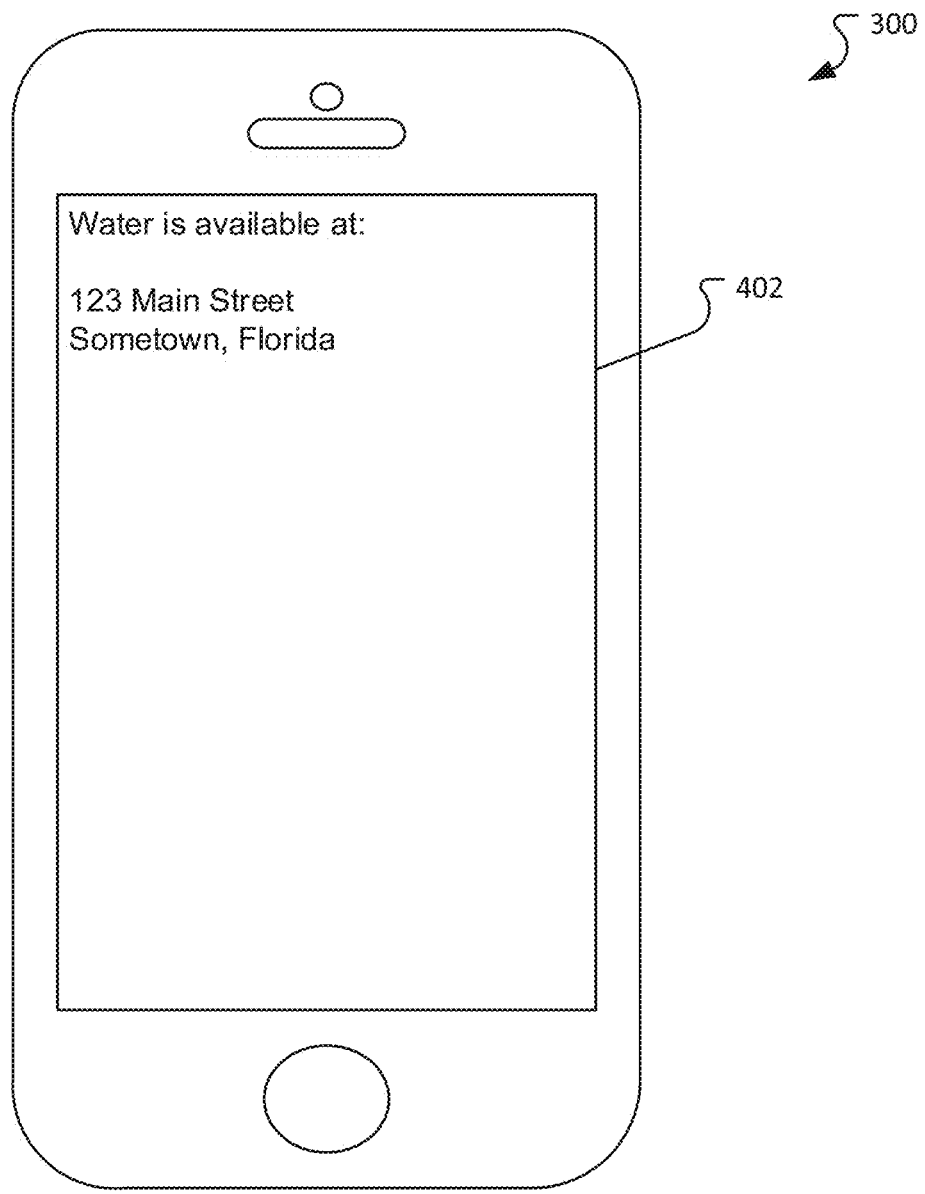
FIG. 4 illustrates an example user interface for displaying a response from a communication server.

FIG. 4 illustrates an example user interface for displaying a response from a communication server. In this example, the response is a simple message that water is available at 123 Main St. in Sometown, Fla. In some implementations, part of the message may be provided by the app. For example, the app may prepend the phrase "water is available at" to the address provided by the communication server. In some implementations, the amount of information provided may vary. For example, the communication server may provide directions or a map. In some implementations, the amount of detail provided by the communication server may depend upon the communication method, as described below.

Figure 5:
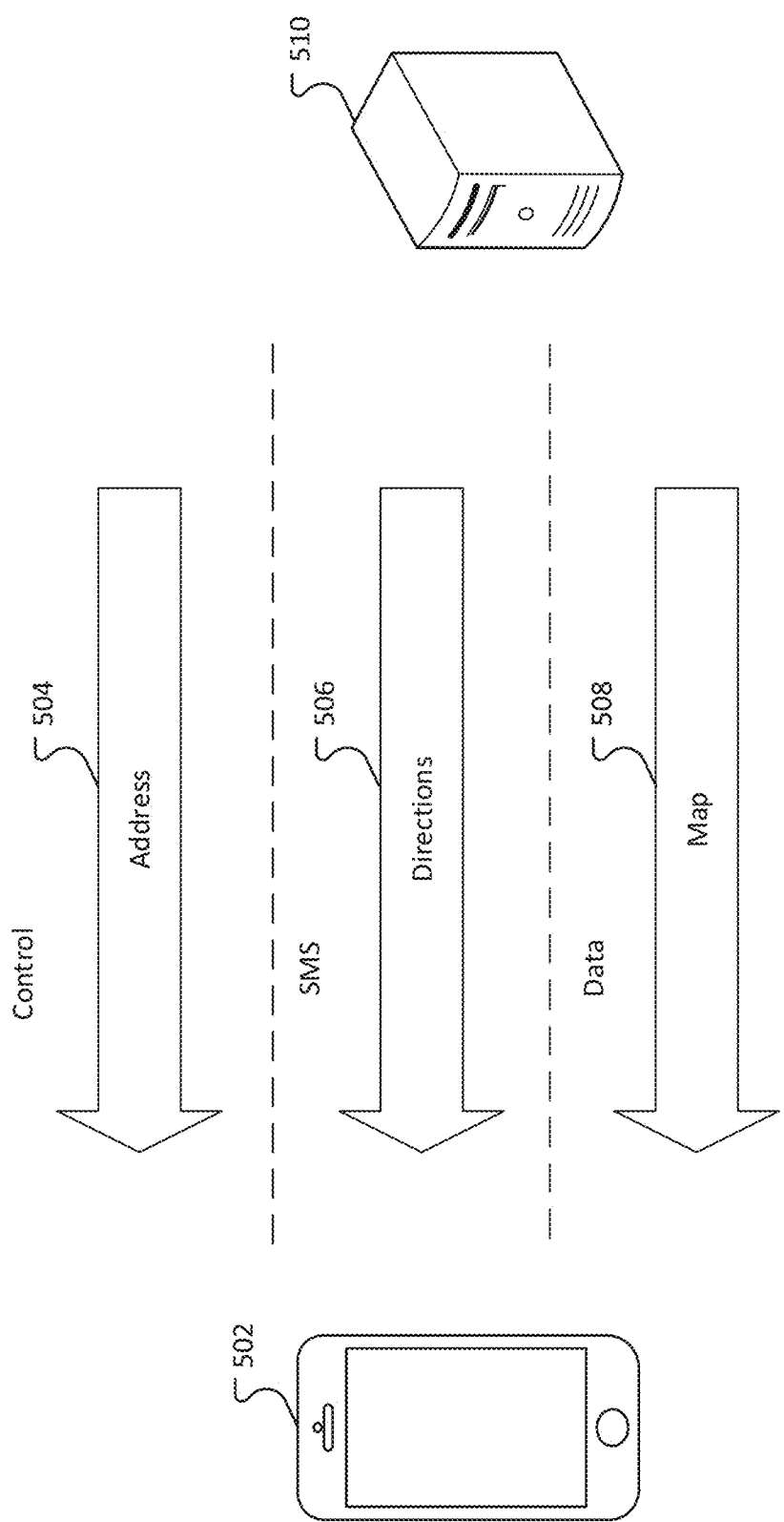
FIG. 5 illustrates an example of different types of responses provided by the communication server, based on the communication channel.

FIG. 5 illustrates an example of different types of responses provided by the communication server, based on the communication channel. In some implementations, the app on the mobile device 502 may select a communication channel based on the availability of the channel. They may communicate using Wi-Fi, or GSM, CDMA, LTE data channels, or MMS/SMS, or GSM, CDMA, or LTE signaling/control channels. In some implementations, the app may prefer the communication channel expected to provide the highest bandwidth. For example, if a Wi-Fi connection is available then the app may communicate using Wi-Fi. If a Wi-Fi connection is not available, the app may check to determine if a GSM, CDMA, or LTE data channel is available. If the GSM, CDMA or LTE data channel is not available the app may try to communicate using an SMS message. If SMS messages are not available then the app may communicate using the GSM, CDMA, or LTE signaling/control channels.

In some implementations the app may prefer the communication channel that is least likely to interfere with the efforts of first responders. For example, the app may prefer a Wi-Fi connection if it is available. But if a Wi-Fi connection is not available, the app may prefer to use the control channel because it places the least burden on the medical infrastructure.

In some implementations, during an emergency the communication server and mobile device will try to ascertain, on a regular basis, if a preferred bandwidth communication channels become available and enable features and services accordingly. For example, if the system is set up to prefer high bandwidth connections over low bandwidth connections, the system may periodically check (e.g., once every 5 minutes, 10 minutes, 30 minutes, 1 day) if a higher bandwidth channel is available. If so, the system will use the higher bandwidth channel.

The communication server 510 may respond to the mobile device 502 using the same communication channel over which the request was received. In some implementations, the amount of information provided in response to a request may depend upon the communication channel being used. For example, if the communication server 510 responds over the control channel, the communication server 510 may send a simple address 504. If the communication server 510 responds with an SMS message, the communication server 510 may send directions as well as the address 506. If the communication server 510 responds over a data channel, the communication server 510 may send a map 508.

In some implementations, the communication server 510 may respond with the smallest amount of data possible (for example, an address) and provide additional information (directions or a map) if the user of the app requests further details.

In some implementations, the app and the communication server may be able to communicate when the conventional communication network has been shut down. In some scenarios, first responders and emergency personnel may deploy a mobile cell site, such as a cell on wheels (COW). A COW is a mobile cell site that consists of a cellular antenna tower and electronic radio transceiver equipment on a truck or trailer, designed to be part of a cellular network typically on a temporary or short-term basis. In general, COWs may be used to provide expanded cellular network coverage and/or capacity in disaster areas where cellular coverage either was minimal, never present (e.g., in a wilderness area where firefighters have set up a command center during a major forest fire), or was compromised by the disaster (e.g., after a hurricane). Generally, the COWs may be restricted to provide access only to first responders and emergency personnel. However, the COW may be configured to allow communication from the app using the control channel, even when other communication is otherwise restricted. The mobile cell cite may be powered by battery or generator power.

The app on the smartphone may also provide other services. For example, a user may be able to notify an insurance provider of property damage.

Figure 6:
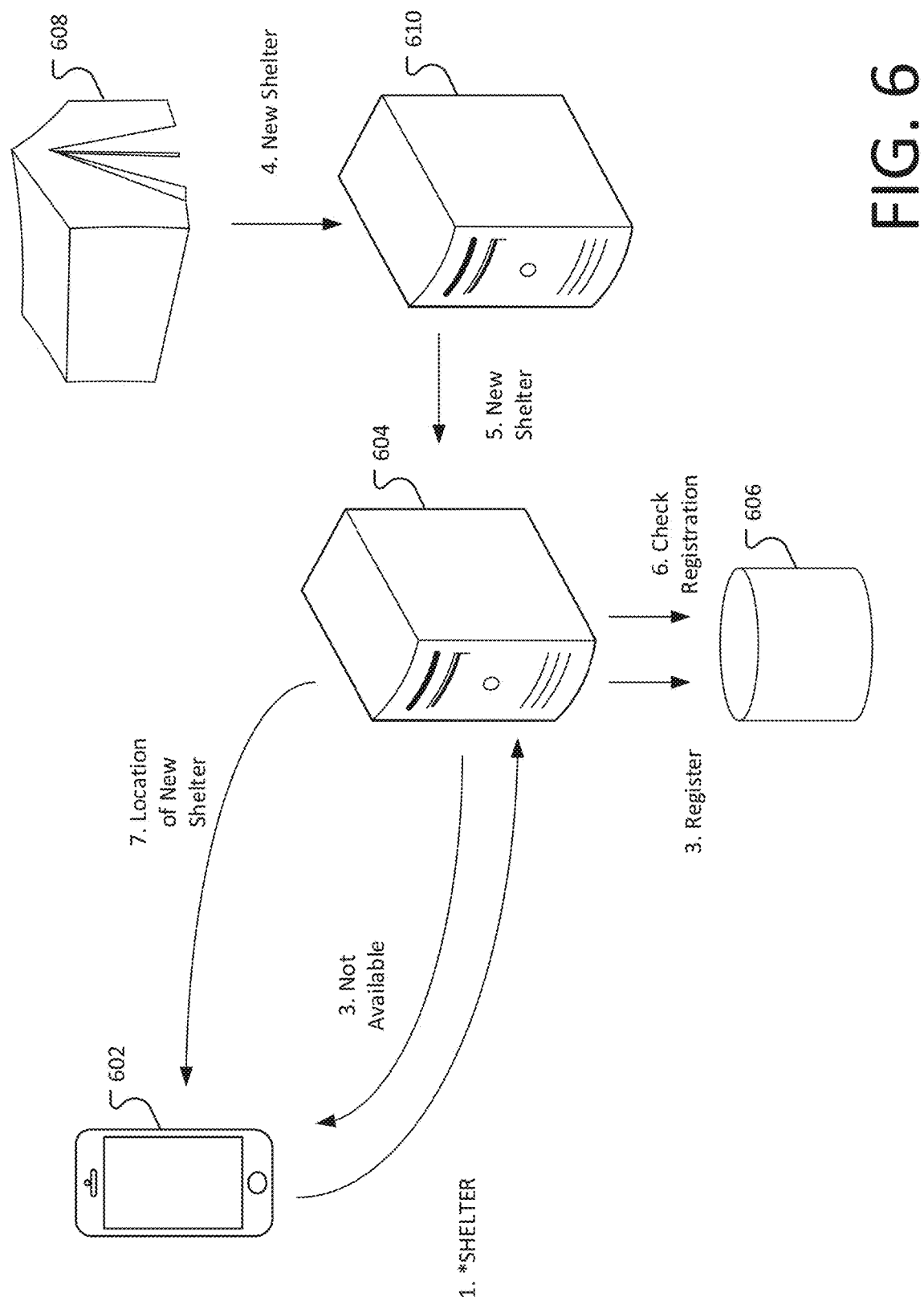
FIG. 6 illustrates an example of a system in which a communication server sends messages to a mobile device.

In some implementations, the communication server can push information out to the mobile device. For example, users in an area may be notified when a service becomes available. FIG. 6 illustrates an example of a system in which a communication server sends messages to a mobile device. In this example, a mobile device 602 sends a message to a communication server 604 requesting information about shelter. The communication server 604 may be unaware of available shelter near the user. The communication server 604 registers the user's request in a database 606 and notifies the user that no shelter is currently available or known.

At a later time, a relief organization establishes a shelter 608 near the user. The relief organization notifies a command and control center 610 about the shelter. The command and control center 610 notifies the communication server 604.

The communication server 604 checks the database for users who requested information about shelter. The communication server 604 identifies the mobile device 602 as a previous requester. The communication server 604 sends a message to the mobile device 602 communicating the location of the shelter.

In some implementations, the mobile device 602 may request to be registered for additional services even if the communication server identifies a relevant service. For example, the user may request to be notified of any future shelters that become available in the area.

Figure 7:
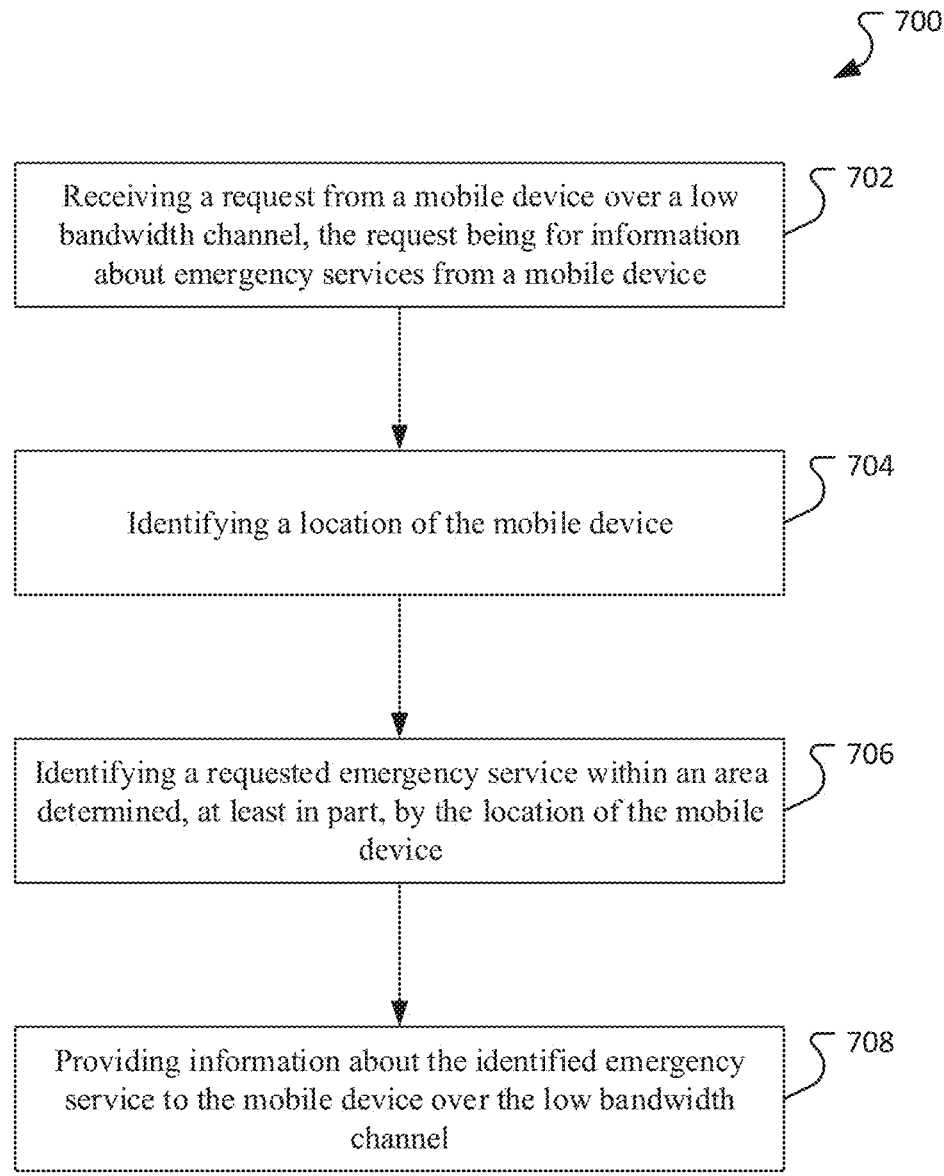
FIG. 7 is a flowchart of an example process for providing disaster support over a low-bandwidth channel.

FIG. 7 is a flowchart of an example process for providing disaster support over a low-bandwidth channel. The process may be performed by a computer system connected to or receiving information from a cellular network.

The process receives 702 a request from a mobile device over a low bandwidth channel, the request being for information about emergency services from a mobile device. The request may be sent from a mobile device using a control channel. In some implementations The process identifies 704 a location of the mobile device. The location can be determined based on the cell tower the mobile device used to send the message or from GPS coordinates provided by the mobile device.

The process identifies 706 a requested emergency service within an area determined, at least in part, by the location of the mobile device. In some implementations, the process begins searching in a relatively small area (for example, a 5 mile radius, the cell associated with the tower, etc.). If the requested service is not available in the area, the process may expand the search to a larger area.

The process provides 708 information about the identified emergency service to the mobile device over the low bandwidth channel.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
   receiving a request from a mobile device over a control channel on a cellular network, the request being for information about a requested emergency service of a plurality of emergency services, wherein the requested emergency service is identified by user-entered data, wherein at least one of the emergency services includes at least one of first aid, food service, insurance information, clothing distribution, shelter, non-governmental agencies, a Federal Emergency Management Agency (FEMA) service, evacuation zones for assembly, and closure information;
   identifying a location of the mobile device;
   identifying an emergency service corresponding with the requested emergency service within an area determined, at least in part, by the location of the mobile device and the user-entered data;
   receiving information about the identified emergency service over the control channel on the cellular network from a third party system; and
   providing information identifying a location of the identified emergency service to the mobile device over the control channel on the cellular network.

2. The computer-implemented method of claim 1, further comprising:
   receiving a check-in request over the control channel on the cellular network from the mobile device;
   identifying one or more individuals to notify; and
   notifying the one or more individuals over the control channel on the cellular network that the user has checked-in.

3. The computer-implemented method of claim 2, further comprising:
   identifying one or more other users who have checked in and are associated with the user;
   providing a list of the one or more other users to the mobile device.

4. The computer-implemented method of claim 2, wherein the check-in request identifies a plurality of individuals to check-in.

5. A non-transitory computer storage medium encoded with computer program instructions that when executed by one or more computers cause the one or more computers to perform operations comprising:
   receiving a request from a mobile device over a control channel on a cellular network, the request being for information about a requested emergency service of a plurality of emergency services, wherein the requested emergency service is identified by user-entered data, wherein at least one of the emergency services includes at least one of first aid, food service, insurance information, clothing distribution, shelter, non-governmental agencies, a Federal Emergency Management Agency (FEMA) service, evacuation zones for assembly, and closure information;
   identifying a location of the mobile device;
   identifying an emergency service corresponding with the requested emergency service within an area determined, at least in part, by the location of the mobile device and the user-entered data;

receiving information about the identified emergency service over the control channel on the cellular network from a third party system; and providing information identifying a location of the identified emergency service to the mobile device over the control channel on the cellular network.

6. The non-transitory computer-readable medium of claim 5, further comprising:

receiving a check-in request over the control channel on the cellular network from the mobile device;

identifying one or more individuals to notify; and notifying the one or more individuals over the control channel on the cellular network that a user has checked-in.

7. The non-transitory computer-readable medium of claim 6, further comprising:

identifying one or more other users who have checked in and are associated with the user;

providing a list of the one or more other users to the mobile device.

8. The non-transitory computer-readable medium of claim 7, wherein the check-in request identifies a plurality of individuals to check-in.

9. A system comprising:

one or more computers and one or more storage devices storing instructions that are operable, when executed by the one or more computers, to cause the one or more computers to perform operations comprising:

receiving a request from a mobile device over a control channel on a cellular network, the request being for information about a requested emergency service of a plurality of emergency services, wherein the requested emergency service is identified by user-entered data, wherein at least one of the emergency services includes at least one of first aid, food service, insurance information, clothing distribution, shelter, non-governmental agencies, a Federal Emergency Management Agency (FEMA) service, evacuation zones for assembly, and closure information;

identifying a location of the mobile device;

identifying an emergency service corresponding with the requested emergency service within an area determined, at least in part, by the location of the mobile device and the user-entered data;

receiving information about the identified emergency service over the control channel on the cellular network from a third party system; and providing information identifying a location of the identified emergency service to the mobile device over the control channel on the cellular network.

10. The system of claim 9, further comprising:

receiving a check-in request over the control channel on the cellular network from the mobile device;

identifying one or more individuals to notify; and notifying the one or more individuals over the control channel on the cellular network that the user has checked-in.

11. The system of claim 10, further comprising:

identifying one or more other users who have checked in and are associated with the user;

providing a list of the one or more other users to the mobile device.

12. The system of claim 11, wherein the check-in request identifies a plurality of individuals to check-in.

* * * * *